United States Patent [19]

Leenders et al.

[11] Patent Number: 5,157,263
[45] Date of Patent: Oct. 20, 1992

[54] METHOD FOR RECORDING AN IMAGE OF IONIZING RADIATION

[75] Inventors: Luc H. Leenders, Herentals; Gentil Verbeke, Edegem; Jan A. Van den Bogaert, Schilde; Frans H. Claes, Boechout; Kudolf Van den Bergh, Herenthout, all of Belgium

[73] Assignee: AGFA-Gevaert, N.V., Mortsel, Belgium

[21] Appl. No.: 580,554

[22] Filed: Sep. 11, 1990

[30] Foreign Application Priority Data

Sep. 12, 1989 [EP] European Pat. Off. ........ 89202295.5

[51] Int. Cl.$^5$ .......................... G03C 1/00; G01T 1/00
[52] U.S. Cl. .............................. 250/484.1; 250/486.1; 430/139
[58] Field of Search .................. 250/484.1 B, 327.1 E, 250/484.1 A, 486.1, 487.1; 430/139

[56] References Cited

U.S. PATENT DOCUMENTS

| | | | |
|---|---|---|---|
| 3,869,363 | 3/1975 | Singh | 430/139 |
| 4,030,926 | 6/1977 | Stahlke et al. | 430/338 |
| 4,675,271 | 6/1987 | Degenhardt | 430/139 |
| 5,098,813 | 3/1992 | Nakano et al. | 250/484.1 B |

Primary Examiner—Janice A. Howell
Assistant Examiner—Richard Hanig
Attorney, Agent, or Firm—Breiner & Breiner

[57] ABSTRACT

A method for recording an image of ionizing radiation comprising the steps of:

(1) image-wise exposing to ionizing radiation an element containing at least one phosphor which converts said ionizing radiation into photochemically active radiation, (2) image-wise exposing a recording material to the thus obtained photochemically active radiation, said recording material containing at least one non-luminescent substance or poorly luminescent substance by means of which through said photochemically active radiation at least one compound is produced forming in said recording material or by transfer into a receptor element a latent luminescent image or by means of which through said photochemically active radiation (a) compound(s) is (are) formed that is (are) allowed to transfer from the recording material into a receptor element to form therein by chemical reaction a latent luminescent image, (3) exposing said latent image to radiation stimulating the fluorescent light emission of the formed luminescent compound(s), and (4) detecting a pattern of fluorescent light emitted by said latent image.

28 Claims, 3 Drawing Sheets

METHOD FOR RECORDING AN IMAGE OF IONIZING RADIATION

DESCRIPTION

1. Field of the Invention

This invention relates to a method for recording an image of ionizing radiation in the form of a pattern of (a) luminescent compound(s) the luminescence of which is stimulated to produce a pattern of fluorescent light that is detected. This invention further relates to a combination of photosensitive elements suitable for radiographic recording and to an apparatus for recording and reading-out of an image produced by ionizing radiation.

2. Background of the Invention

In U.S. Pat. No. 3,859,527 a method of producing a recorded image corresponding to a releasably stored image of a pattern of high energy radiation has been claimed, wherein the method comprises the steps of:
  releasing the stored image as emitted light on a point by point basis and converting the image into electrical energy modulated in accordance with the point by point intensity of the light emitted;
  converting the modulated electrical energy into correspondingly modulated light, and
  recording an image with said modulated light that represents the high energy radiation pattern on a point by point basis. In said process the medium for releasably storing an image representative of the pattern of high energy radiation is a storage phosphor transparent to its own emitted radiation. Examples of applied phosphors are SrS:Ce,Sm and $La_2O_2S:Eu,Sm$.

According to U.S. Pat. No. 4,239,968 the storage phosphors elected for stimulable radiography with visible light or infra-red light are europium doped alkaline earth metal fluorohalide phosphors represented by the general formula $(Ba_{1-x}M_x^{II})FXyA$, representatives of which such as BaFBr:Eu have been described already in GB-P 1 419 169 for use in X-ray intensifying screens.

According to Radiology, Volume 171, No. 2, May 1989, p. 301 the image resolution obtained with stimulable phosphor panels scanned with a laser beam for producing stimulated light emission that is detected and amplified by photomultiplier is approximately only 2.5 line pairs per millimeter, whereas with classical X-ray image intensifying screens more than 5 line pairs can be reproduced.

Photostimulable phosphors do not permanently retain the stored energy, normally the storage time is not longer than 8 hours during which the stored energy image fades gradually. The stored image cannot be stimulated repeatedly which makes it impossible to produce a series of read-out patterns.

Known stimulable phosphors such as $BaFBr:Eu^{2+}$ have response times of the order of 0.5 microseconds which limits the maximum rate at which the information can be scanned with a laser beam without impairing the spatial resolution.

A particular point to be noted when using stimulable storage phosphor screens is their property to accumulate the ionizing energy coming from the environment, which is particularly disadvantageous when radiographs have to be made in circumstances of increased radioactivity, e.g. due to a nuclear incident. The classical radiographic X-ray intensifying screen-silver halide emulsion film combination will also fail in such circumstances because of the fact that penetrating ionizing radiation emitted in the environment will produce accumulated fog in highly photosensitive silver halide emulsion materials used in X-ray recording with X-ray conversion screens.

Up till now no convenient and efficient solution to that problem has been found.

In U.S. Pat. Nos. 3,719,571 and 3,801,782 processes and materials are described for storage and retrieval of information comprising the use of non-fluorescent material capable of photoconversion to a fluorescent material under light of a particular wavelength and which can be made to fluoresce, after such conversion, by stimulating light of radiation of a longer wavelength, hereby forming a fluorescent image that is detected. The storage of information in that way is rapid, accurate and dry.

In U.S. Pat. No. 4,030,926 a storage medium for optical data recording is described which medium contains a dye-forming combination which on exposure to light within a first range of wavelengths reacts irreversibly to form a dye, but is substantially insensitive to light within a second range of wavelengths that is capable of energizing the dye to produce luminescence. An example of dye forming combination by means of which a latent luminescence image can be produced is on the basis of benzofuran and dibromomaleic anhydride. In the latter US-P has been said that both the recording of the information as well as the reading of it, can be carried out simultaneously or successively, depending on whether the recording layer is energized to luminescence either simultaneously over a wide area or successively by line-by-line scanning by means of ultra-violet light within the second range of wavelengths. For this purpose a laser beam may be used, e.g. the emission radiation of certain nobel gas lasers such as $Ar^+$ or $Kr^+$ lasers.

SUMMARY OF THE INVENTION

It is an object of the present invention to provide a method for recording and storing an image of ionizing radiation also called high energy radiation by forming a latent luminescent image showing no or very small dark-decay in photostimulability, having the property of fluorescent light emission as long as the stimulation lasts with no limit in time and offering the possibility of multiple read-out.

It is likewise an object of the present invention to provide a method for recording and storing an image of ionizing radiation by forming a luminescent image that can be read out within very short stimulation times in the order of less than 0.1 microsecond.

It is a further object of the present invention to provide a method for recording and storing an image of ionizing radiation wherein the obtained image has good image quality with regard to resolution and graininess.

It is another object of the present invention to provide such method by forming a latent luminescent image that can be transformed photoelectronically into digitized signals that can be stored in a memory medium and displayed on an electronic display device, e.g. a cathode ray tube or used to modulate printing light, e.g. of a laser beam.

It is still another object of the present invention to provide a combination of elements by means of which a pattern of ionizing radiation can be recorded as a latent luminescent image that can be photostimulated without limit in time.

It is still another object of the present invention to provide an apparatus containing means for recording an image of ionizing radiation in the form of a latent luminescent image and means for detecting said luminescent image to transduce luminescent light energy of said image into electrical signals that can be digitized and stored.

Other objects and advantages of the present invention will become clear from the following description.

In accordance with the present invention a method for recording an image of ionizing radiation is provided which method comprises the steps of:

(1) image-wise exposing to ionizing radiation an element containing at least one phosphor which converts said ionizing radiation into photochemically active radiation, (2) image-wise exposing a recording material to the thus obtained photochemically active radiation, said recording material containing at least one non-luminescent substance or poorly luminescent substance by means of which through said photochemically active radiation at least one compound is produced forming in said recording material or by transfer into a receptor element a latent luminescent image or by means of which through said photochemically active radiation (a) compound(s) is are formed that is (are) allowed to transfer from the recording material into a receptor element to form therein by chemical reaction a latent luminescent image, (3) exposing said latent image to radiation stimulating the fluorescent light emission of the formed luminescent compound(s), and (4) detecting a pattern of fluorescent light emitted by said latent image.

By the wording ionizing radiation is understood X-ray radiation, Gamma ray radiation, fast electron radiation, e.g. of cathode ray tube, Beta-ray radiation and neutron radiation. Said ionizing radiation is also known under the name high energy radiation.

Further in accordance with the present invention a combination suitable for radiography is provided comprising (1) at least one fluorescent screen containing at least one phosphor layer capable of emitting photochemically active radiation when irradiated by ionizing radiation, and 2) a photosensitive recording material containing at least one non-luminescent or poorly luminescent compound by means of which through the intermediary of said photochemically active radiation a latent luminescent image can be formed, the luminescence of which can be stimulated by radiation having a wavelength or wavelength range differing from the wavelength or wavelength range of the photochemically active radiation emitted by said screen(s).

Further in accordance with the present invention an apparatus for recording and reading-out of an image produced by ionizing radiation is provided, wherein said apparatus contains:

(1) a means for applying ionizing radiation, (2) at least one phosphor containing means to transform the ionizing radiation into photochemically active radiation, (3) a means for receiving said photochemically active radiation and for forming with said photochemically active radiation a latent image of (a) luminescent substance(s), (4) a means for photostimulating said latent image to emit a fluorescent light image, and (5) a means for detecting said fluorescent light image.

By photochemically active radiation is understood ultraviolet, visible and infrared radiation, in particular electromagnetic radiation in the wavelength range of 250 to 750 nm. As is commonly known photochemical systems that are originally only sensitive to ultraviolet radiation, i.e. to 250 to 400 nm wavelength radiation, can be spectrally sensitized to become sensitive to visible light and/or infrared radiation by using appropriate spectral sensitizing agents.

The terminology "luminescent" relates to "fluorescent" and "phosphorescent" as well; the phenomenon of fluorescence being restricted to fluorescent light emission that stops almost immediately (within less than 1 millisecond) after the photostimulation, whereas phosphorescence lasts much longer and may be in the order of seconds and even hours.

DETAILED DESCRIPTION OF THE INVENTION

Figure 1:
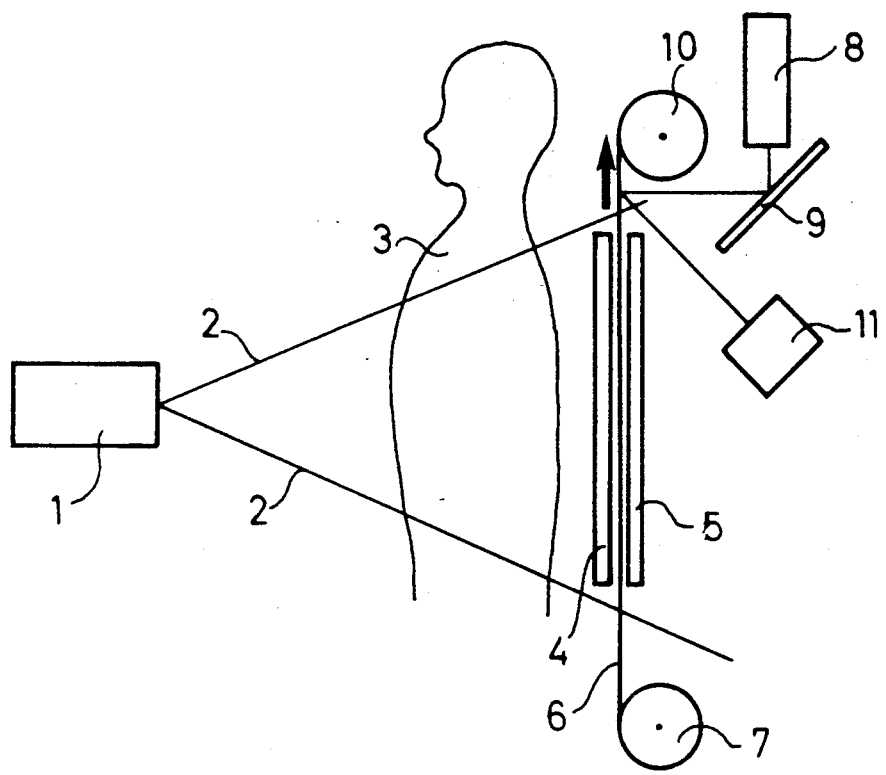
FIG. 1 represents a cross-sectional schematic drawing of an apparatus for recording and reading-out of an image produced by ionizing radiation according to the present invention.

The present invention will hereinbelow be described in further detail.

Known phosphors suitable for use according to the present invention are listed in the following Table wherein they are grouped according to their main emission colour or main emission peak (nm).

TABLE

| UV | | Blue | | Green | | Red | |
|---|---|---|---|---|---|---|---|
| (Y,Sr,Li)TaO$_4$:Nb | 390 | CaWO$_4$ | 425 | Gd$_2$O$_2$S:Tb | 544 | Gd$_2$O$_2$S:Eu | 611 |
| (Y,Sr,Li,Gd)TaO$_4$ | 315 | LaOBr:Tb | | Y$_2$O$_2$S:Tb | 544 | YTaO$_4$:Eu | 611 |
| YTaO$_4$:Tm | 325–400 | BaSO$_4$:Sr,Eu | | Y$_2$O$_5$:Tb | 544 | Y$_2$O$_2$S:Eu | 611 |
| YTaO$_4$:Nb | 325–400 | | | La$_2$O$_2$S:Tb | 544 | (Y,Sr,Li)TaO$_4$:Eu | |
| YTaO$_4$ | 315–400 | | | (Zn,Cd)S:Ag | 530 | | |
| (Y,Sr,Li)TaO$_4$ | 325 | | | | | | |
| BaFCl:Eu | 390 | | | | | | |
| BaFBr:Eu | 390 | | | | | | |
| Y$_2$O$_2$S:Gd | 315 | | | | | | |

The use of mixtures of these phosphors is within the scope of the present invention.

The above mentioned tantalate phosphors can be prepared by a method described in published European Patent applications No. 0 011 909 or 0 202 875.

Suitable short wavelength UV-emitting phosphors are lead-activated strontium haloborates described by A. Meijerink et al., in Journal of Solid State Chemistry 76, 115–123 (1988) which phosphors have an emission situated at about 280 nm. Other useful short wavelength UV-emitting phosphors are lead-activated Ba,Zn silicates described in Dutch Patent 104 632. These phosphors have emission peaks at 290 and 305 nm. Further examples of long wavelength UV-emitting phosphors, also called near ultraviolet region emitting phosphors, are given in U.S. Pat. No. 3,702,828 relating to europium-activated barium and strontium, calcium, aluminum fluoride phosphors with sharp UV emission at 360 nm.

In the preparation of fluorescent screens the phosphors used according to the present invention are incorporated in particulate form in a binder material known for that purpose to those skilled in the art. The binder layer incorporating the dispersed phosphor particles is usually applied onto a sheet support, e.g. cardboard, resin base or metal support, e.g. aluminium. The phosphor binder layer may contain screening dyes to improve the image sharpness and the phosphor layer may be applied on a light reflecting base for improving the light output.

A usual phosphor coverage is in the range of 100 g/m2 to 1500 g/m2.

When forming the latent luminescent image in the recording material itself the fluorescence stimulating exposure of the latent luminescent image proceeds with radiation differing in wavelength range from the radiation emitted by said phosphor(s). Different wavelengths are not necessary when the latent luminescent image is formed in a separate receptor element as described more in detail furtheron.

According to a first embodiment a recording material suited for use according to the present invention contains a luminescent compound precursor that without reaction with any other compound(s) under the influence of said photochemically active radiation emitted by said phosphor(s) becomes a luminescent compound the fluorescence of which is stimulable by irradiation with radiation differing in wavelength or wavelength range from the radiation emitted by said phosphor(s).

According to a second embodiment a recording material suited for use according to the present invention contains a substance or substances that is or are (a) precursor(s) of luminescent compound(s) in combination with (a) photosensitive substance(s) that by photochemical reaction under the influence of said photochemically active radiation emitted by said phosphor(s) transform said precursor(s) into a luminescent compound(s) that by irradiation with radiation differing in wavelength or wavelength range from the radiation emitted by said phosphor(s) are stimulable to emit fluorescent light.

According to a third embodiment a recording material suited for use according to the present invention contains a photosensitive substance that during and/or after photo-exposure with said photochemically active radiation in a redox reaction can be reduced with a non-luminescent substance that in said redox reaction obtains luminescent properties by oxidation.

According to a fourth embodiment a recording material suited for use according to the present invention contains a combination of reactants that by photochemical reaction under the influence of the photochemically active radiation emitted by said phosphor(s) react to form (a) luminescent compound(s) that by irradiation with radiation differing in wavelength or wavelength range from the radiation emitted by said phosphor(s) are stimulable to emit fluorescent light.

In a particular embodiment said luminescent compound(s) is (are) formed upon ultraviolet light exposure of a first range of wavelengths and their fluorescence is stimulated with ultraviolet light in a second range of wavelengths not including said first range.

In other words according to said embodiment the stimulation of the latent luminescence image proceeds with ultraviolet radiation in a wavelength range wherein substantially no formation of said luminescent compounds takes place. For said embodiment an ultraviolet radiation emitting phosphor is selected emitting strongly in the wavelength range wherein the conversion of non-luminescent compounds in the recording material into luminescent compounds or luminescent compound precursors takes place rapidly and the stimulation proceeds with ultraviolet radiation of longer wavelength by means of which said conversion reaction proceeds substantially slower or does not proceed at all. The fluorescent light emitted by the obtained luminescent compound(s) is preferably light of the visible wavelength range and/or of the infrared light wavelength range that can be detected selectively with respect to the applied ultraviolet stimulating radiation by using e.g. an appropriate optical cut-off filter blocking selectively the luminescence stimulating ultraviolet radiation and transmitting selectively the fluorescent light.

Luminescent precursor compounds that without reaction with (an) other compound(s) become luminescent compounds by irradiation with ultraviolet radiation of a wavelength or wavelength range different from the one used in stimulating the obtained luminescent compound for its emission of fluorescent light are described e.g. in U.S. Pat. Nos. 3,719,571 and 3,801,782. Specific examples of such compounds are 9,10-diphenyl,1,4-dihydro-anthracene-1,4-anhydride [reported quantum yield (Phi)=0.65] and 2-(2-furyl or thienyl) -3-acylchromones.

Further are mentioned non-luminescent 9,10-dimers (cyclomers) of anthracene and substituted derivatives thereof that are de-dimerized with short UV radiation of about 254 nm to form anthracene or an anthracene derivative having fluorescent properties on photostimulation with longer wavelength UV radiation of about 365 nm.

Examples of precursor(s) of luminescent compound(s) that in combination with (a) photosensitive substance(s) undergo a photochemical reaction under the influence of ultraviolet radiation of a wavelength or wavelength range different from the one used in photostimulating the fluorescent light emission are described e.g. in the DDR patent specification 227 813 relating to the use of Beta-naphthylfulgides and derivatives for producing by photo-oxidation a latent fluorescent image. Other examples of precursors of fluorescent compounds are described in Römpps Chemie-Lexikon, 7. Auflage (1973) p. 1170 under the heading: "Fluoreszenzindikatoren". Preferred precursors are eosine and fluoresceine which compounds by raising the pH above 4 of an originally fairly acidic recording layer obtain fluorescent properties. Suitable photosensitive base precursors that photochemically split off a base for use in said combination are described e.g. in U.S. Pat. Nos. 3,877,941 and 3,918,973. In Research Disclosure October 1974, item 12617 a photochemically base-releasing metal complex is described, more particularly a cobalt ammine complex in conjunction with a photoreductant whereby on exposure ammonia is split off. Heat may assist in the development of gaseous ammonia.

Another example of a combination of compounds for forming according to the present invention a latent luminescent image is described in U.S. Pat. No. 3,801,782 which combination contains Rhodamine B lactone in conjunction with photosensitive iodoform or chloroform. The quantum yield (Phi) of the reaction for forming Rhodamine B (red fluorecer) with photo-exposed chloroform is said to be 0.4. Analogously to the use of chloroform or iodoform that decompose photochemically to yield active hydrogen and halogen, carbon tetrabromide can be used in conjunction with a hydrogen donor, i.e. active hydrogen compound, as described e.g. in U.S. Pat. Nos. 3,810,762 and 3,810,763. The latter combination offers the possibility of image amplification by so-called optical development explained in the last mentioned US-P documents.

Photosensitive silver halide is suitable for use in the above mentioned third embodiment in combination with a non-luminescent reducing agent that in the redox-reaction (development) of the photo-exposed silver halide is oxidized to form a fluorescent compound. Examples of suitable reducing agents are the already mentioned Beta-naphthylfulgides. Said redox reaction can be carried out almost dry by using heat. For improving development speed the heat development, e.g. in the range of 80° to 150° C., of the latent silver image proceeds advantageously in the presence of a compound known as thermosolvent. Suitable thermosolvents, also called heat or thermal solvents, are described e.g. in U.S. Pat. Nos. 3,347,675—3,438,776—3,667,9-59—4,740,446, in DE-A 3,339,810, in published European Patent applications (EP-A) 0,119,615 and 0,122,512, in GB-P 2 156 091 and in Research Disclosure 15027 (October 1976).

The latent luminescent image can be produced likewise with the aid of photosensitive silver halide in a photothermographic process analogously to the process described in GB-P 2 156 091, but instead of forming a dye image by a photothermographic dye diffusion transfer process a reagent, e.g. luminescent compound precursor, is split off imagewise by a redox reaction taking place during the development of an imagewise photo-exposed photothermographic silver halide recording material to form in the recording layer or after transfer into a receptor element a luminescent compound. For example, in said receptor element a splitted off non-luminescent anthraquinone type compound representing a luminescent compound precursor is transformed photochemically by reaction with a hydrogen donor into a luminescent dihydroxy-anthracene (for said reaction reference is made to U.S. Pat. No. 3,801,782, column 5, lines 1-11). The receptor element can form part of the recording material, i.e. is present together with the recording element in a unitary sheet or web material, or is a separate element, e.g. receptor layer on sheet or web support, wherein the luminescent compound precursor is transferred by diffusion from the developing or developed photographic silver halide recording material.

According to a particularly interesting embodiment illustrated furtheron in Example 2 a recording material suited for use according to the present invention contains a dye image-forming coupler compound capable of releasing a fluorescent compound, e.g. 7-hydroxycoumarin (umbelliferone), as a function of silver halide development. Examples of compounds capable of releasing a fluorescent moiety or compound by reaction with a p-phenylene diamine type colour developer are described in U.S. Pat. No. 4,774,181.

In order to inhibit the migration of the released fluorescent compound into the developing bath the recording material contains a mordant for the imagewise released fluorescent moiety or compound.

Typical mordants which can be included are known from dye diffusion transfer photography as described e.g. in Research Disclosure November 1976, item 15162 and the already mentioned U.S. Pat. No. 4,774,181. In order to avoid optical interference of the formed silver image and dye image with the image built up with the released fluorescent compound(s) the mordant is applied preferably on top of the silver halide emulsion layer containing the dye image-forming coupler compound.

According to another embodiment the mordant is applied in a separate receptor material wherein the image-wise released fluorescent compound is transferred by diffusion. On pre-wetting the exposed recording material with developing liquid before contact with said receptor material the pre-wetting of the recording material has to proceed in such a way that no substantial part of the released fluorescent substances is lost in the developing bath and therefore the wetting of the silver halide emulsion layer with the developing liquid is followed as soon as possible by the contacting with the receptor material.

According to a particular embodiment the exposed and still dry recording material is contacted with a receptor material pre-wetted with the developing liquid. The receptor material contains preferably a mordant as defined hereinbefore.

Examples of silver-free compounds that under the influence of radiation emitted by short wavelength ultraviolet light can react to form a luminescent compound the fluorescent light emission of which is stimulable by irradiation with ultra-violet radiation of a longer wavelength are described in U.S. Pat. No. 4,030,926.

The recording material described in U.S. Pat. No. 4,030,926 comprises for the photochemical production of a luminescent compound a mixture of at least one non-luminescent compound within the scope of the following general formulae (I) and at least one other non-luminescent compound within the scope of the following general formula (II):

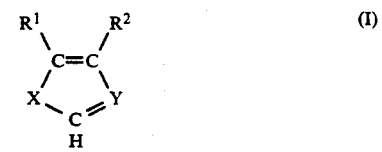

wherein:
X represents oxygen, sulfur or the group N-R$^3$,
Y represents nitrogen or the group C-R$^4$;
R$^1$ and R$^2$, which may be the same or different, represent hydrogen or an alkyl or aryl group including said groups in substituted form or may together represent the group required to complete a condensed benzene or naphthalene ring including said rings in substituted form, R³ represents hydrogen or an alkyl group or an aryl group including said groups in substituted form, and R⁴ represents hydrogen or an alkyl group including a substituted alkyl group;

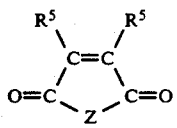  (II)

wherein:

Z represents oxygen or the group N-R⁶ or

R⁵ represents halogen, e.g. chlorine, bromine or iodine,

R⁶ represents hydrogen or an alkyl group including a substituted alkyl group, and R⁷ and R⁸, which may be the same or different, represent hydrogen or an alkyl group including a substituted alkyl group.

Suitable heterocyclic compounds within the scope of general formula (I) are e.g. furan, thiophene, benzofuran, benzothiophene, benzimidazole, 3-methylbenzofuran, N-phenyl-benzimidazole, 4,5-diphenylimidazole, 4-nitro-benzimidazole, 4-chloro-benzimidazole, naphth-[2,3-d]imidazole, 5-chlorobenzofuran, 3,4-dimethylfuran, furyl-2-acetonitrile and 2-phenylfuran. Particularly suitable heterocyclic compounds within the scope of the formula (I) are those in which X represents an oxygen atom and Y represents a CH group, such as furan and benzofuran either or not in substituted form.

Particularly suitable cyclic dihalodicarbonyl compounds according to general formula (II) are the anhydrides and cyclic imides of dihalomaleic acid, the halogen R⁵ preferably being bromine.

It has been found suitable to add to the recording layer composition minor quantities (about 0.2 to 5 percent by weight based on the total content) of a compound which has a triplet energy larger than 55 kilocalories per mol. Examples of such compounds are diacetyl, benzophenone and acetophenone.

The sensitivity can also be increased by the addition of photoinitiators such as O-acyloximes, benzoin isopropyl ether, bromoform or iodoform as well as polar solvents such as dimethylsulfoxide and N-methyl-pyrrolidinone added in combination with a polyethylene glycol.

The sensitivity can further be increased by incorporating the reactants of general formulae (I) and (II) in oil former droplets dispersed in a hydrophilic binder, a technique known from silver halide photography. Suitable oil formers are tricresyl phosphate and dibutyl phthalate.

The total quantity of the combination of reactants according to said general formulae (I) and (II) may be 3 to 50% by weight based on the binder and the coverage is e.g. in the range of 1 to 20 g per m². The lower limit is determined actually by the detection sensitivity of the electronic detection device, e.g. phototube or photomultiplier, by means of which signal amplifications corresponding with an amplification factor 10⁷ can be obtained [ref. "Principles and Applications of Photochemistry" by Richard P. Wayne—Oxford University Press (1988), p. 165].

The reactant(s) according to general formula (I) is (are) preferably used in at least a double molar quantity with respect to the reactant(s) according to general formula (II).

The recording material containing the above reactants has a sensitivity to ultraviolet light within a first range of very short wavelengths with a maximum between about 200 and 310 nm. The sensitivity is negligible above 350 nm. The luminescent compound formed by the reactants has an absorption maximum above 350 nm, i.e. in the region of longwave ultraviolet radiation. By exposure to stimulating light in the range of 350 to 400 nm the luminescence is activated and fluorescent light with a wavelength maximum between 440 and 660 nm is emitted.

The recording material for use according to the present invention comprises the precursors for forming luminescent compounds and/or reactants for forming such compounds preferably in a binder.

According to one embodiment the recording material represents a self-supporting web or sheet. The self-supporting web or sheet contains a single recording element or a combination of recording elements (multilayer system). The multi-layer system can be produced by a multiple layer coating system, e.g. slide hopper coating, co-extrusion, or lamination using e.g. heat, pressure and/or an adhesive.

According to another embodiment said precursors is are applied as (a) supported layer(s) on a sheet or web support. For example, the support is single or double-side coated, including the possibility of a combination of a plurality of recording layers of different composition. The support may be opaque or transparent to ultraviolet radiation and/or transparent or opaque to the emitted fluorescent light. Suitable supports include paper supports and film supports known from silver halide photography, e.g. cellulosetriacetate or polyethylene terephthalate supports. Other possible supports supports are aluminum supports and glass supports.

The binder may be hydrophilic or hydrophobic and is preferably itself poorly absorbing in the wavelength region of the photochemically active radiation emitted by the applied phosphor screen(s).

According to a preferred embodiment binder compounds are used having an intrinsic UV absorption below 250 nm.

Preferred polymeric hydrophobic binders are selected from the group consisting of homopolymers and copolymers of monomers which have copolymerizable olefinic double bonds, polyvinyl acetals and cellulose esters.

Examples of suitable poorly UV absorbing binder materials are waterinsoluble homo- and copolymers of vinyl esters such as vinyl acetate, vinyl chloride, styrene, (meth)acrylic esters, preferably polymethylmethacrylate, acrylonitrile, vinylacetals, e.g. butyral and formal, polycarbonates, polyesters, mixed polyestercarbonates, cellulose esters, e.g. cellulose acetate butyral and cellulose alkylsuccinate.

Examples of watersoluble polymers are poly(meth)acrylamide and N-substituted, e.g. with HOCH₂- substituent, poly(meth)acrylamides.

In a preferred embodiment the photostimulating exposure of the latent luminescent image produced according to the present invention proceeds with ultraviolet radiation of longer wavelength than the UV radiation used in the formation of said latent image. Preferably there is a wavelength difference of at least 30 nm between the radiation used in the photochemical reaction and the radiation used in the stimulating of the fluorescent light emission of the latent luminescent image.

According to a first mode of photostimulation the fluorescence stimulating exposure of the above mentioned step (3) proceeds by a simultaneous overall exposure, i.e. an exposure by flooding the recording material containing said latent image with the fluorescence stimulating radiation.

According to a second mode of photostimulation the fluorescence stimulating exposure of the above mentioned step (3) proceeds successively, e.g. proceeds scanningwise by a successive point by point exposure of said latent image. That successive exposure proceeds preferably with a linewise scanning laser beam.

Photostimulation of fluorescence may proceed with commonly known lamps (e.g. with high and low pressure mercury vapour lamps) or with a laser, e.g. a He-Cd laser, argon ion laser or tunable organic dye laser.

According to a first embodiment the detection of the emitted fluorescent light proceeds photographically on a photochemical recording material, e.g. a photosensitive silver halide emulsion recording material.

According to a second embodiment the detection of the emitted fluorescent light proceeds photoelectrically, e.g. by means of photoelectron emission in a phototube or photomultiplier providing electrical signals that may undergo an analog-digital conversion.

The electrical signals may be stored and subjected to digital processing for improving image quality or varying image contrast (ref. Research Disclosure, April 1985, item 25235).

The electrical analog or digital signals may be used for display on a cathode-ray tube.

A hard copy of the recorded information may be obtained by using the electrical signals stemming from the photoelectronic detection of the fluorescent light pattern to modulate a writing laser beam associated with a photosensitive recording material, e.g. electrophotographic recording material, thermographic recording material, e.g. for thermal transfer of dyes, or photosensitive silver salt recording material.

The stimulation of the latent luminescence image proceeds preferably in a linewise fashion which may be orthogonally or spirally.

The photochemically produced fluorescent compounds have normally photostimulation response times of the order of 10-20 nanoseconds so that, if sufficient laser beam power is used, they can be read-out substantially more rapidly than the comparatively slow stimulable phosphors.

A photochemically produced latent luminescence image need not be erased as is the case with the reusable stimulable storage phosphor screens so that the whole recording and reading system can be simplified and the operating time shortened by the omission of a time consuming erasure step. However, it is possible to use reversible photofluorescent systems wherein by a first irradiation of a non-fluorescent substance with radiation of a particular wavelength or wavelength range a fluorescent compound is formed which compound is transformed again in a non-fluorescent substance by a second irradiation with radiation having a wavelength or wavelength range different from the one used in the first irradiation. An example of such system is formed by cyclomeric dimers of anthracene that in a first exposure are de-dimerized to form a fluorescent anthracene and can be cyclomerized again by a second exposure the radiation of which is differing in wavelength or wavelength range from the radiation used in said first exposure.

The recording of the scanningwise emitted fluorescent light proceeds e.g. with a light-collector connected to a photomultiplier tube as illustrated e.g. in U.S. Pat. Nos. 4,258,264; 4,748,326; 4,829,180 or U.S. Pat. No. 4,778,995.

The photochemical production of a latent luminescent image in a dry way offers the benefit of direct digitization of the photostimulated luminescent image and the possibility of image processing. Digitization of the electronic output signals produces quantized gray-scale values. If an 8-bit analog-digital converter (ADC) is employed, the resultant image will contain as many as 256 quantization steps or shades of gray. When a 12-bit ADC is employed as for chest radiography, the resultant image can have up to 4,096 quantization levels.

The record containing the photochemically produced luminescent image can be read at a later time since there is no substantial dark-decay of the latent luminescent image and it can be read several times without decay in fluorescence level.

The fluorescence of the latent luminescent image obtained in the recording method according to the present invention is maintained as long as there is an input of stimulating light such being in contrast with the use of a stimulable storage phosphor screen of which the stored information is destroyed during the exposure with fluorescence stimulating radiation. By the fact that fluorescent light emission in the method according to the present invention can be maintained as long as desired the recording of fluorescent light can occur with photographic materials having a relatively poor photosensitivity, e.g. DRY SILVER (trade name) recording materials that are exposed to the fluorescent light only by using a proper cut-off filter excluding the exposure with the light used in the photostimulation of the latent luminescent image. A long exposure time will provide here the necessary light dose for image recording in said rather poorly photosensitive recording material. In the photostimulation of the latent luminescent image a flood light or simultaneous exposure is then used preferably.

The simultaneous exposure with stimulating light makes it likewise possible to record the image of fluorescent light with a still video camera, e.g. with CCD-array camera (CCD stands for charge coupling device) known to those skilled in the art.

Further it is possible to introduce in the recording material already containing a latent luminescence pattern add-on information in image frame area still not containing a luminescent compound.

The combination of phosphor fluorescent screen(s) and (a) recording material(s) for producing therein a latent luminescent image according to the present invention can be used in classical clinical X-ray equipment operating with a front and back screen having the recording material for producing therein a latent luminescent image inbetween and in close contact with said screens during the X-ray exposure. A sheet representing the recording material used according to the present invention for obtaining a latent luminescent image may be arranged in a cassette between X-ray conversion screens.

For obtaining an improved input of photochemically active radiation in the recording material used according to the present invention for the production of a latent luminescent image at least one of the fluorescent phosphor screens is provided with a reflective backing layer for reflecting the photochemically active radiation so that the radiation emitted by the phosphor screen(s) can enter several times the recording material increasing thereby the probability of its absorption and photochemical action.

According to another embodiment the member of the recording material containing the photosensitive substance(s) used for forming luminescent compound(s) during the recording stands in contact with an element reflecting the photochemically active radiation or said member is present (coated) on a reflective backing, e.g. is coated on a vacuum deposited aluminium layer, that is highly reflective for UV-radiation. Such recording material is used in combination with only one phosphor screen.

In the medical X-ray field it is often necessary to provide information on soft tissue structures and bone-like structures simultaneously. For that purpose dual-energy techniques operating in a single shot X-ray exposure with a low energy absorbing front screen and a high energy absorbing back screen separated by X-ray beam hardening filter have been used in classical conventional screen-film assemblage exposure as well as in X-ray imaging with stimulable storage phosphor screens (ref. Dev P. Chakraborty and Gary T. Barnes in Med. Phys. 16 (1), January/Febuary 1989, p. 7).

The production of low- and high-energy images that are acquired simultaneously avoids image misregistration between the low- and high-energy exposures that could occur by patient motion and makes that X-ray tube loading is less.

For the front screen preferentially absorbing the low-energy X-ray photons, useful in the imaging of the structure of soft tissue, low atomic number phosphors are used, whereas the higher energy part of the X-ray beam giving more information on the bone structure is absorbed or stopped in a back screen containing a higher atomic number phosphor.

Particularly in digital dual-energy mammography their is a need for storage phosphors that have a high difference in stopping power and high conversion efficiency of stored X-ray energy into light on photostimulation.

In the above mentioned periodical Med. Phys. 16 (1), p. 7-8 an energy sensitive cassette for dual-energy mammography has been described wherein the back imaging plate contains a commercial barium fluorobromide phosphor and the front plate contains a similar but no commercially available strontium fluorobromide phosphor. The selection of these phophors has been made in view of the K edges of Ba and Sr being respectively 37.4 and 16.1. The Ba K edge ensures high absorption efficiency of the barium fluorobromide phosphor above 38 keV, whereas the strontium fluorobromide plate is absorbing effectively in the X-ray region from 15 to 25 keV. In a practical assemblage the phosphor screens are separated by an X-ray hardening filter, wherein one of the screens, the screen most close to the X-ray source and called front screen, contains a photostimulable phosphor with low X-ray-stopping power and the other screen contains another photostimulable phosphor having a substantially higher X-ray stopping power for higher energy X-ray photons than said phosphor of the front screen. The X-ray hardening interscreen filter material is made e.g. of copper.

It is within the scope of the present invention to provide a recording combination by means of which ionizing radiation of different energy is recorded simultaneously. Said combination includes a plurality of non-luminescent recording materials wherein photochemically a latent luminescent image can be produced, and wherein each of said recording materials during a single shot X-ray exposure is associated with a different X-ray conversion screen having different X-ray stopping power. For example, one phosphor screen being the front screen has an effective stopping power for 15 to 25 keV X-rays and the other screen being the back screen has an effective stopping power for X-rays of 30 keV and more.

According to a special embodiment in a single recording material a mixture of different luminescent compound precursors is contained wherein a first group of said precursors is converted into luminescent compounds by the photochemically active radiation emitted by the X-ray conversion screen with lower X-ray stopping power and the other group of precursors is converted into luminescent compounds by the photochemically active radiation emitted by the X-ray conversion screen with higher X-ray stopping power, and wherein the obtained different types of luminescent compounds for selective read out of the obtained latent luminescent compounds for selective read out of the obtained latent luminescent images are photostimulable with photostimulation light of different wavelength or wavelength range.

The present method of recording an image of ionizing radiation includes autoradiography. An autoradiograph is a photographic record of the radioactive material within an object, produced by putting the object in contact with a photographic material. In the present method the radioactive object is placed in contact with or in close proximity with a phosphor screen emitting photochemically active radiation under the influence of the ionizing radiation stemming from the radioactivity in said object. The obtained pattern of photochemically active radiation is absorbed by the recording material wherein said latent luminescent image is formed. In general, autoradiography is a laboratory process applied to microtome sections of biological tissues which contain radioisotopes, metallographic samples and the like.

For use in autoradiography wherein normally only small samples are non-destructively tested it may be convenient to use phosphor screens containing the phosphor particles mixed with the compounds wherefrom the latent luminescent image is produced. The re-use of said phosphor screens is not possible when a permanent latent luminescent image is formed, but such is not that expensive when only small size phosphor screens have to be used, e.g. of the size of a microscope test object.

It is known that in radiographic non-destructive testing (NDT) methods, also called industrial radiography, the exposure dose may be much higher than in medical radiography wherein living tissue is involved. There is no risk of image blurring in radiographing non-moving objects, so that relatively long exposure times can be applied.

According to an embodiment offering a fluorescent image of improved light output a photostimulable storage phosphor screen is held in contact with a recording material used according to the present invention during a single shot exposure to ionizing radiation of said screen in contact with said recording material. Hereby photochemically active radiation emitted promptly by said photostimulable storage phosphor screen is absorbed by said recording material and produces therein a latent image of luminescent compound(s). In the production of the fluorescent light image the stimulable phosphor screen is maintained in contact with the recording material containing a latent luminescent image and both said elements, the screen and the recording material, are exposed simultaneously by the same stimulating light, e.g. laser beam, wherein the stimulating light penetrates first into said recording material wherein it is partially absorbed and converted into fluorescent light and then strikes the stimulable phosphor screen wherefrom additionally fluorescent light is emitted congruently with the fluorescent light pattern of said recording material.

According to an embodiment the recording material used according to the present invention is arranged in close contact with a photostimulable storage phosphor screen in a cassette as described e.g. in published European Patent application (EP-A) 0 309 874.

Since the recording materials used according to the present invention can be much more flexible than is the case with phosphor screen sheets having a thick phosphor coating their transport is much easier and the the transport systems in the radiographic apparatus wherein they are applied are less cumbersome.

In a particular embodiment said recording material is used in the form of a flexible web and exposed between and in contact with two prompt emitting X-ray conversion screens as illustrated in FIG. 1.

Said FIG. 1 represents a schematical cross-sectional view of an apparatus according to the present invention wherein element 1 is an X-ray exposure source emitting X-rays 2 modulated by the internal structure of a person 3 to be radiographed. The modulated X-ray beam strikes a front X-ray conversion screen 4 and a back X-ray conversion screen 5 both said screens emitting photochemically active radiation that is absorbed by the recording material in the form of a web 6. The photochemically active radiation absorbed in web 6 forms therein a latent luminescent image. The web is supplied by an unwinding roll 7 and is during the non-exposure stage conveyed between the screens 4 and 5 which allow passage for each new image frame. In the exposure stage the screens 4 and 5 make with their phosphor layer side intimate contact with the web 6.

The photostimulation of the photochemically obtained latent luminescent image in the web 6 proceeds with a laser beam emitted by the laser device 8, e.g. a He-Cd laser emitting continuously a 442 nm wavelength light or an argon ion laser emitting continuously ultraviolet radiation with a 351.1 or 363.8 nm wavelength or visible light with 488 nm wavelength. A light deflector 9 formed of a galvanometer mirror or the like deflects the laser beam so that it strikes the web 6 in linewise scanning fashion while the web 6 is wound up on the take up roll 10.

A photoelectronic detector 11 (e.g. photomultiplier tube) receives the fluorescent light which is separated from the stimulating light by a cut-off filter (not shown in the drawing). Instead of a photomultiplier tube a photoelectric amplification channel plate may be used as the fluorescent light detecting and amplifying means. There is no need for an erasing light source.

According to an embodiment suitable for the production of a series of rapidly following exposure frames (as in cineradiography) the read-out of the series of latent luminescent images proceeds in a later stage following the series of X-ray exposures, such being possible by the fact that the latent luminescent images obtained according to the present invention do not fade. For that purpose the part of the web containing a series of exposed image frames is wound on an accumulator roll and cut at the required length whereupon that part is read out.

The invention is illustrated by the following examples without however, limiting it thereto. All ratios and percentages are by weight unless otherwise stated.

EXAMPLE 1

A 5% solution of polymethylmethacrylate in methylene chloride was made and in that solution an amount of the non-luminescent fluorescent compound precursor 2-furyl-3-benzoyl-chromone (prepared according to Huffman, Kuhn, Zweig, JACS, 92:3/Feb. 11, 197) was dissolved in a ratio of 0.167 to the total solid content.

The obtained solution was coated at both sides of a 60 micron thick unsubbed polyethylene terephthalate support at such coating thickness that at each side after drying a solid recording layer having a thickness of 7 micron was obtained.

Figure 2:
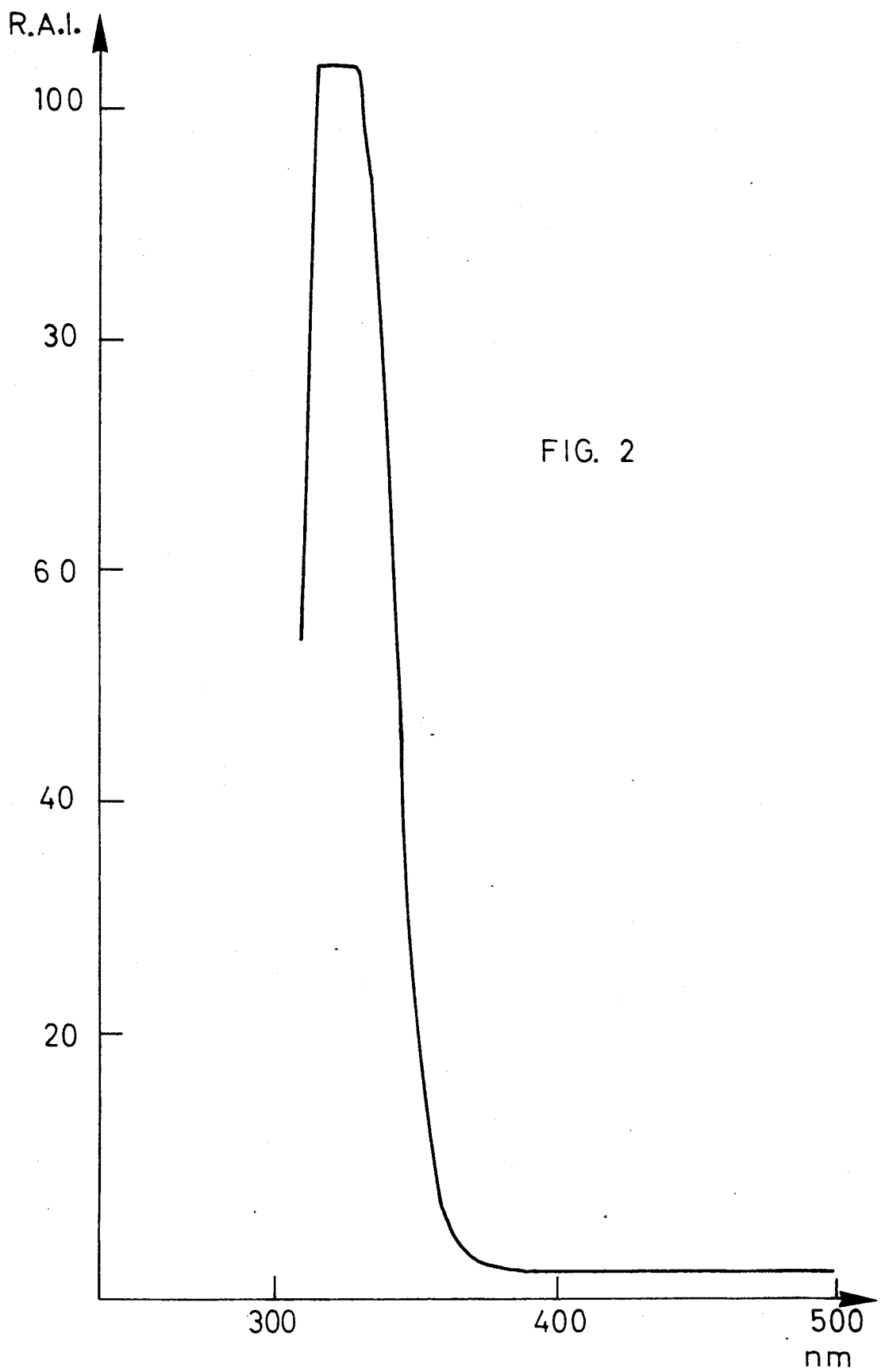
FIG. 2 represents the absorption spectrum of a recording material incorporating 1,2-furyl-3-benzoylchromone used in Example 1 as non-luminescent photosensitive precursor of a fluorescent compound.

The absorption curve of an unexposed single-side coated recording material incorporating said chromone is given in the graph represented in FIG. 2 having in the abscissa the wavelength in nm and in the ordinate the relative absorption intensity (R.A.I.).

Figure 3:
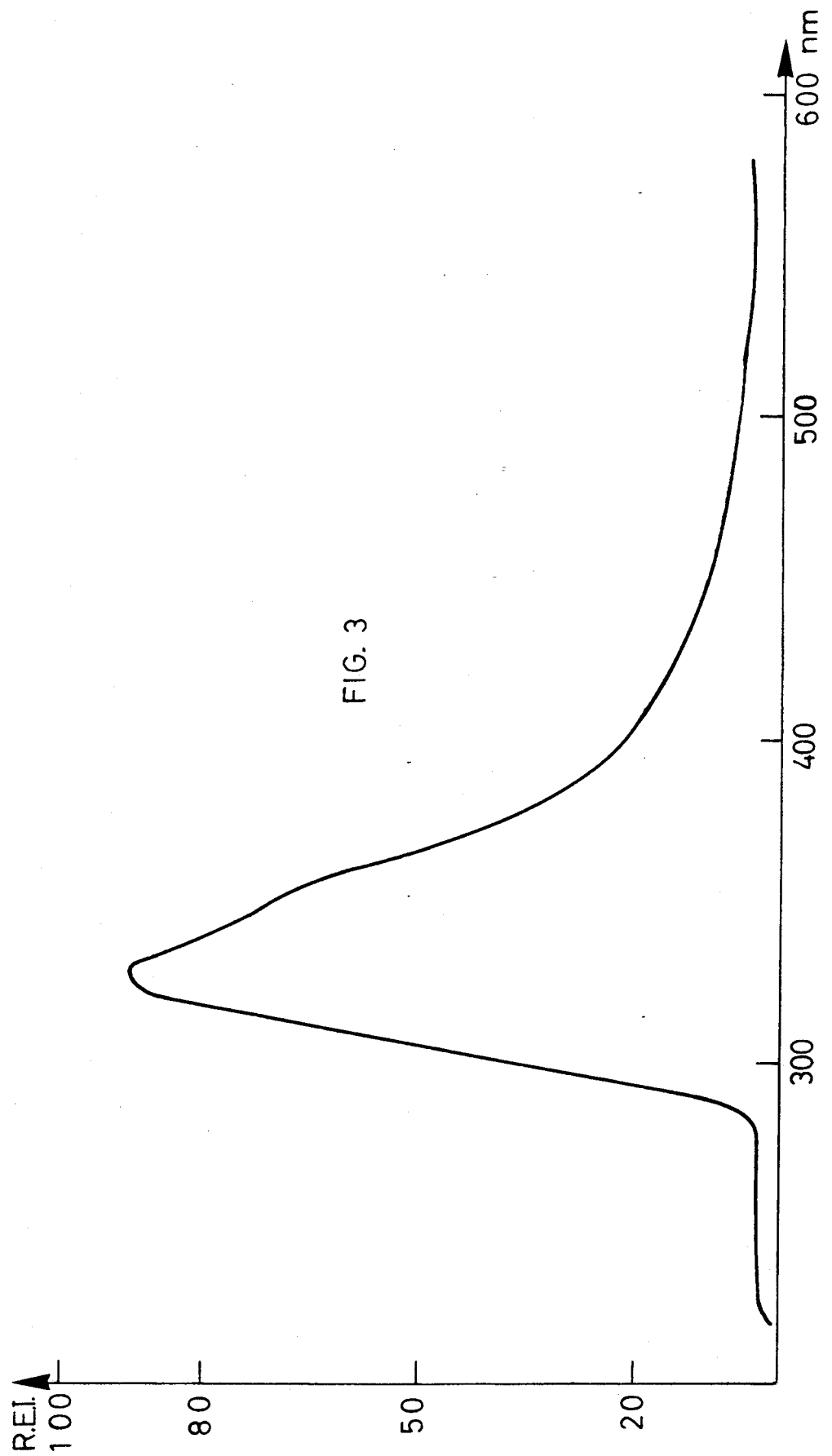
FIG. 3 represents the light emission spectrum obtained on X-ray exposure of a tantalate phosphor used in said Example 1.

The double-side coated recording material was arranged between two phosphor screen materials having each a phosphor layer in contact with a recording layer. The phosphor layers contained undoped $(Y,Sr,Li)TaO_4$ phosphor particles the emission curve of which under X-ray excitation is given in the graph of FIG. 3. In said graph the relative emission intensity (R.E.I.) is in the ordinate and the wavelength in nm of the emitted light is in the abscissa. The phosphor was applied at a phosphor coverage of 600 g per $m^2$ in a polymethylmethacrylate binder on a 175 micron thick polyethylene terephthalate resin support.

The combination of said screens and recording material was exposed to 80 keV X-rays through an aluminium step wedge.

In the recording material a latent luminescent image of photochemically transformed chromone (fluorescence light emission peak at about 510 nm) was obtained.

The obtained latent luminescent image was scanned with a laser beam emitted by He-Cd laser (442 nm line) and the emitted fluorescent light was detected with a photomultiplier tube through a cut-off (SCHOTT type GG 475—Mainz—W. Germany) filter having a transmission smaller than 90% at wavelength (lambda) larger than 475 nm and a transmission smaller than $10^{-5}$ at lambda smaller than 450 nm. The photomultiplier was provided with a bi-alkali (Na-K) photocathode (broad absorption at 400 nm). The obtained electrical signals were digitized and used to modulate a writing laser beam of He-Ne laser for exposure of a red-sensitized silver halide emulsion recording material which on development yielded a high quality copy of the original aluminium step wedge.

EXAMPLE 2

Photographic silver halide emulsion material

A subbed polyethylene terephthalate film support having a thickness of 100 μm was single-side coated with a green-sensitized silver bromide-iodide (molar ratio of Br/I: 96.5/3.5) emulsion to obtain a photographic layer containing 2.3 g of gelatin per sq.m and the silver halide at a coverage equivalent with 4.00 g of silver nitrate per sq.m. Before coating said emulsion was mixed with a very poorly fluorescing colour coupler (see structural formula at the end of the description of this example) capable of releasing in colour development the strongly fluorescing 4-methyl-7-hydroxycoumarin. Said colour coupler was coated at a coverage of 0.15 g/m². Said colour coupler forms a yellow dye on coupling with oxidized p-phenylene diamine and is therefore actually a yellow dye forming coupler.

Said single side coated recording material having on top of the silver halide emulsion layer a protection layer of hardened gelatin at a coverage of 1.4 g/m² was arranged at the silver halide emulsion layer side in contact with a commercial phosphor screen "CURIX ortho fast" containing a terbium activated gadolinium oxysulfide (Gd $_2$O$_2$S:Tb) converting X-rays into mainly green light. CURIX is a registered trade name of Agfa-Gevaert N. V. Belgium.

The combination of said contacting screen and photographic silver halide emulsion material was exposed to 80 keV X-rays through an aluminium step wedge.

The development of the thus exposed photographic silver halide emulsion film proceeded with a p-phenylene-diamine type developer described in Example 1 of U.S. Pat. No. 3,734,735.

The development was carried out at 25° C. in a developer tray wherein the film was kept in contact with the developer bulk for a duration of only 10 seconds. On leaving the development tray the still wet emulsion side of the film sheet was arranged into contact with a colour diffusion transfer receptor sheet containing a mordant as described in Example 12 of U.S. Pat. No. 4,186,014, whereupon both materials were separated after 3 minutes.

In the receptor material a latent fluorescent image was obtained by transferring therein 4-methyl-7-hydroxycoumarin in correspondence with the X-ray exposed areas of the photographic film material.

The photostimulation of the fluorescent image proceeded with an Argon ion laser using its 351.1 nm emission line. The emitted visible fluorescent light was detected with a photomultiplier tube through a cut-off filter having a transmission larger than 90% at wavelength (lambda) larger than 420 nm and a transmission smaller than $10^{-5}$ at lambda smaller than 390 nm. The photomultiplier was provided with a bi-alkali (Na-K) photocathode (broad absorption at 400 nm). The obtained electrical signals were digitized and used to modulate a writing laser beam of He-Ne laser for exposure of a red-sensitized silver halide emulsion recording material which on development yielded a high quality copy of the original aluminium step wedge.

Structural formula of the colour coupler capable of releasing 4-methyl-7-hydroxycoumarin:

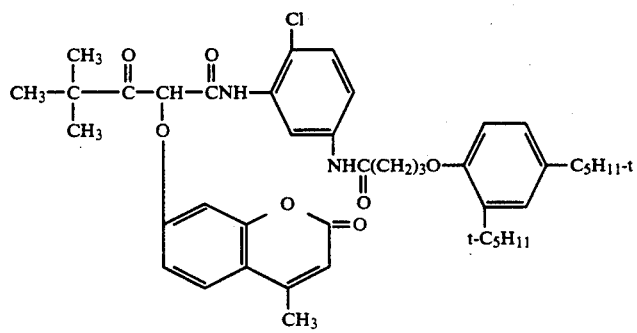

The preparation of said colour coupler proceeds analogously to a technique described in U.S. Pat. No. 4,774,181.

We claim:

1. A method for recording an image of ionizing radiation comprising the steps of:
   (1) image-wise exposing to ionizing radiation an element containing at least one phosphor which converts said ionizing radiation into photochemically active radiation,
   (2) image-wise exposing a recording material to the thus obtained photochemically active radiation, said recording material containing at least one non-luminescent substance or poorly luminescent substance by means of which through said photochemically active radiation at least one compound is produced forming in said recording material or by transfer into a receptor element a latent luminescent image or by means of which through said photochemically active radiation (a) compound(s) is are formed that is (are) allowed to transfer from the recording material into a receptor element to form therein by chemical reaction a latent luminescent image,
   (3) exposing said latent image to radiation stimulating the fluorescent light emission of the formed luminescent compound(s), and
   (4) detecting a pattern of fluorescent light emitted by said latent image.

2. A method according to claim 1, wherein said ionizing radiation is X-ray radiation.

3. A method according to claim 1, wherein said photochemically active radiation emitted by said phosphor is in the wavelength range of 250 to 400 nm.

4. A method according to claim 3, wherein the fluorescence stimulating exposure of said latent image proceeds with radiation differing in wavelength or wavelength range from the radiation emitted by said phosphor(s).

5. A method according to claim 1, wherein the fluorescence stimulating exposure of step (3) proceeds scanningwise by a laser beam.

6. A method according to claim 1, wherein the detection of the emitted fluorescent light proceeds photoelectrically.

7. A method according to claim 1, wherein the recording material comprises the precursors for forming luminescent compounds and/or reactants for forming such compounds in a binder.

8. A method according to claim 1, wherein the recording material contains a support that is single or double-side coated with said non-luminescent substance or poorly luminescent substance.

9. A method according to claim 1, wherein said recording material contains a luminescent compound precursor that without reaction with any other compound(s) under the influence of said photochemically active radiation emitted by said phosphor(s) becomes a luminescent compound the fluorescence of which is stimulable by irradiation with radiation differing in wavelength or wavelength range from the radiation emitted by said phosphor(s).

10. A method according to claim 1, wherein said recording material contains a substance or substances that is or are (a) precursor(s) of luminescent compound(s) in combination with (a) photosensitive substance(s) that by photochemical reaction under the influence of said photochemically active radiation emitted by said phosphor(s) transform said precursor(s) into a luminescent compound(s) that by irradiation with radiation differing in wavelength or wavelength range from the radiation emitted by said phosphor(s) are stimulable to emit fluorescent light.

11. A method according to claim 1, wherein said recording material contains a photosensitive substance that after photo-exposure with said photochemically active radiation in a redox reaction can be reduced with a non-luminescent substance that in said redox reaction obtains luminescent properties by oxidation.

12. A method according to claim 1, wherein said recording material contains a combination of reactants that by photochemical reaction under the influence of the photochemically active radiation emitted by said phosphor(s) react to form (a) luminescent compound(s) that by irradiation with radiation differing in wavelength or wavelength range from the radiation emitted by said phosphor(s) are stimulable to emit fluorescent light.

13. A method according to claim 1, wherein said recording material contains photosensitive silver halide.

14. A method according to claim 13, wherein by a photothermographic dye diffusion transfer process a luminescent compound precursor is split off imagewise by a redox reaction taking place during the development of an imagewise photo-exposed photothermographic silver halide recording material to form in a recording layer or after transfer into a receptor element a luminescent compound.

15. A method according to claim 13, wherein the recording material contains a dye image-forming coupler compound capable of releasing a fluorescent moiety or compound as a function of silver halide development.

16. A method according to claim 15, wherein the recording material contains a mordant for the imagewise released fluorescent compound.

17. A method according to claim 15, wherein the recording material is used in conjunction with a receptor material into which the image-wise released fluorescent compound is transferred by diffusion.

18. A method according to claim 1, wherein during the image-wise exposure to ionizing radiation said recording material is arranged between two screens having a phosphor layer contacting said recording material.

19. A method according to claim 18, wherein said two screens have different X-ray stopping power.

20. A combination suitable for radiography comprising (1) at least one fluorescent screen containing at least one phosphor layer capable of emitting photochemically active radiation when irradiated by ionizing radiation, and 2) a photosensitive recording material containing at least one non-luminescent or poorly luminescent compound by means of which through the intermediary of said photochemically active radiation a latent luminescent image can be formed, the luminescence of which can be stimulated by radiation having a wavelength or wavelength range differing from the wavelength or wavelength range of the photochemically active radiation emitted by said screen(s).

21. A combination suitable for radiography according to claim 20, wherein said combination comprises said recording material arranged between two screens having a phosphor layer contacting said recording material.

22. A combination according to claim 21, wherein one of said screens has an effective stopping power for 15 to 25 keV X-rays and the other screen has an effective stopping power for X-rays of 30 keV and more.

23. A combination according to claim 20, wherein in said screen said phosphor layer is applied on a support or backing layer reflecting the photochemically active radiation emitted by said phosphor layer.

24. A combination according to claim 20, wherein said recording layer is applied on a support or backing layer reflecting the photochemically active radiation emitted by a phosphor of said screen.

25. An apparatus for recording and reading-out of an image produced by ionizing radiation, wherein said apparatus contains:
  (1) a means for applying ionizing radiation,
  (2) at least one phosphor containing means to transform the ionizing radiation into photochemically active radiation,
  (3) a non-luminescent means for receiving said photochemically active radiation and for forming with said photochemically active radiation a latent image of (a) luminescent substance(s),
  (4) a means for photostimulating said latent image to emit a fluorescent light image, and
  (5) a means for detecting said fluorescent light image.

26. An apparatus according to claim 25, wherein said means for photostimulating the fluorescence of said latent luminescent image is a laser beam.

27. An apparatus according to claim 26 wherein, the laser beam is produced by a He-Cd laser, an argon ion laser or tunable organic dye laser.

28. An apparatus according to claim 25, wherein the means for detecting said fluorescent light image is a still video camera with photosensitive CCD array, a photomultiplier tube or a photoelectric amplification channel plate.

* * * * *